United States Patent
Magliochetti

[19]

[11] Patent Number: 5,806,528

[45] Date of Patent: Sep. 15, 1998

[54] IN-LINE TEMPERATURE SENSING DEVICES, SYSTEMS AND METHODS

[75] Inventor: Michael J. Magliochetti, Iowa City, Iowa

[73] Assignee: Urosurge, Inc., Coralville, Iowa

[21] Appl. No.: 539,441

[22] Filed: Oct. 5, 1995

[51] Int. Cl.⁶ .................................................. A61B 19/00
[52] U.S. Cl. ..................... 128/897; 128/898; 215/11.2; 215/13.1; 215/365; 215/366
[58] Field of Search .................................. 215/366, 11.2, 215/13.1, 365; 128/898, 897

[56] References Cited

U.S. PATENT DOCUMENTS

| | | |
|---|---|---|
| 3,440,882 | 4/1969 | Jones . |
| 3,647,279 | 3/1972 | Sharpless et al. . |
| 3,651,695 | 3/1972 | Brown . |
| 3,864,976 | 2/1975 | Parker . |
| 3,872,050 | 3/1975 | Benton et al. . |
| 4,077,260 | 3/1978 | Gray et al. . |
| 4,156,365 | 5/1979 | Heinmets et al. . |
| 4,179,397 | 12/1979 | Rohowetz et al. . |
| 4,188,437 | 2/1980 | Rohowetz . |
| 4,468,137 | 8/1984 | Hilsum et al. . |
| 4,637,896 | 1/1987 | Shannon . |
| 4,671,675 | 6/1987 | Arisi et al. . |
| 4,743,120 | 5/1988 | Bowen . |
| 4,773,767 | 9/1988 | Coll . |
| 4,859,360 | 8/1989 | Suzuki et al. . |
| 4,867,325 | 9/1989 | Dransfield ............................. 215/11.2 |
| 5,156,785 | 10/1992 | Zdrahala . |
| 5,169,397 | 12/1992 | Sakashita et al. . |
| 5,248,305 | 9/1993 | Zdrahala . |

*Primary Examiner*—Mickey Yu
*Assistant Examiner*—Dinh X. Nguyen
*Attorney, Agent, or Firm*—Thomas J. Engellenner; Lahive & Cockfield, LLP

[57] ABSTRACT

Devices, systems and methods for measuring and providing a visual indication of the temperature of a fluid prior to its delivery to a patient are disclosed. In one embodiment of the invention, in an irrigation fluid delivery system having a fluid delivery tube adapted to deliver an irrigation fluid to a patient, a temperature sensing device for measuring and for providing a visual indication of the temperature of the irrigation fluid immediately prior to the fluid being delivered to a patient can be incorporated into the fluid delivery tube. In another aspect of the invention, an irrigation fluid delivery system having a heating means and a temperature sensing means can be used for heating the fluid and for measuring and providing a visual indication of the temperature of the fluid prior to the fluid entering the patient. In both the above-identified embodiment and aspect of the invention, the temperature sensing device can consist of a thermochromic liquid crystalline polymer extruded or otherwise molded into the fluid delivery tube. The polymer can be capable of exhibiting at least one color change in response to a change in temperature. In yet another aspect of the invention, the temperature of an irrigation fluid in a fluid delivery tube can be measured prior to the fluid entering the patient. A fluid delivery tube including a thermochromic liquid crystalline polymer which is molded into the fluid delivery tube and capable of exhibiting at least one color change in response to a change in temperature can be provided. The fluid can be passed through the tube and the temperature of the fluid qualitatively measured by observing the color of the thermotropic polymer in the fluid delivery tube.

18 Claims, 3 Drawing Sheets

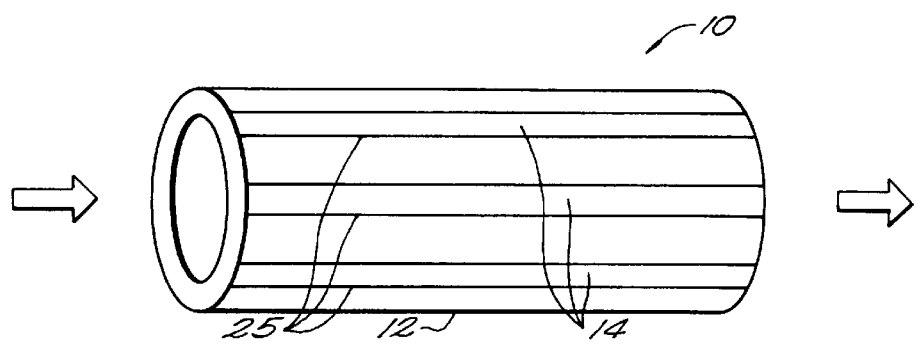
FIG. 3B
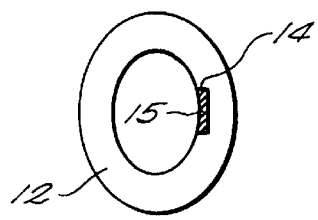 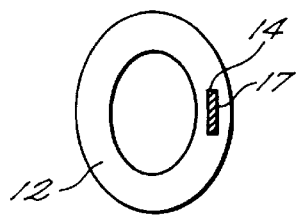 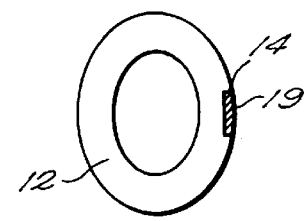
FIG. 4A    FIG. 4B    FIG. 4C
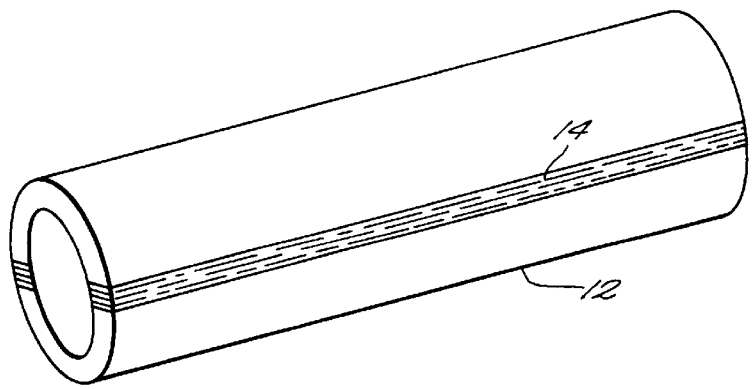
FIG. 5

5,806,528

IN-LINE TEMPERATURE SENSING DEVICES, SYSTEMS AND METHODS

BACKGROUND OF THE INVENTION

The field of the invention concerns fluid delivery to a patient and, in particular, in-line temperature sensing of fluids prior to their delivery to a patient.

One of the problems typically encountered in fluid delivery to a patient is the need for monitoring of the temperature of fluids prior to their delivery to a patient. Introduction of sub-body temperature fluids to the patient may well cause discomfort, shock or another type of trauma. Such fluids are often heated prior to delivery, since they are typically stored at temperatures lower than that of the patient's body temperature. Over-heating, like under-heating, must be avoided because over-heating of some fluids, such as transfusion fluids, may cause denaturing of the fluid, in addition to potentially causing physical problems for the patient. In extreme cases such as warming of blood products for rapid infusion after trauma, overheating can cause hemolysis and subsequent patient death. Further, accurate display of the post-heating temperature of a fluid immediately prior to its delivery to a patient is critical, as temperature losses occur as a function of flow rate.

Various techniques employing liquid crystal materials which change color with a change in temperature have been used for sensing the temperature of intravenous solutions. See, for example, U.S. Pat. No. 3,651,695 by Brown and U.S. Pat. No. 4,859,360 by Suzuki el al. Typically, liquid crystal materials are dispersed on a black background layer or other material to form a display. This display is then bonded or otherwise secured on or around a fluid conduit or container, such as a blood carrying tube or blood bag.

Such traditional temperature display devices and methods do not accurately measure fluid temperature, however, because they measure the outside surface temperature of the fluid conduit or container and fail to compensate for the temperature gradient which exists between the inner fluid and the conduit or container outer surface. Some of these traditional temperature display devices are also irreversible and do not allow the display of reversible temperature transitions. Further, traditional temperature display devices and methods do not allow clinicians to observe the flow and condition of fluids in the fluid conduit or container, because the devices are secured or otherwise bonded around the conduit or container. In addition, traditional temperature devices and methods do not provide complete and integrated systems for heating and providing direct temperature sensing of delivery fluids prior to their delivery to patients.

Accordingly, there exists a need for devices, systems and methods for more accurately sensing and providing a visual indication of the temperature and continuing temperature transitions of delivery fluids, particularly for transfusion and/or irrigation purposes.

SUMMARY OF THE INVENTION

Devices, systems and methods are disclosed for measuring and providing a visual indication of the temperature of a fluid prior to its delivery to a patient. The present invention is based on the recognition that a thermochromic liquid crystal temperature sensing element can be extruded or otherwise molded into the wall of a fluid delivery tube. Thermochromic is defined herein as changing color in response to a change in temperature.

In one embodiment of the invention, a temperature sensing, irrigation fluid delivery, device is disclosed having a fluid delivery tube adapted to deliver an irrigation fluid to a patient, and a temperature sensing device for measuring and for providing a visual indication of the temperature of the irrigation fluid prior to the fluid being delivered to a patient. The temperature sensing device can consist of a thermochromic liquid crystalline polymer extruded or otherwise molded into the fluid delivery tube. The polymer exhibits at least one color change in response to a specific change in temperature.

The thermochromic liquid crystalline polymer can consist of a thermotropic or cholesteric mesophase disposed in a stripe form or otherwise disposed within a wall of the fluid delivery tube. The liquid crystalline polymer can also be co-extruded within the fluid delivery tube. The thermochromic liquid crystalline polymer can be a transparent or first color at a given temperature (i.e. a room or storage temperature of the fluid) and can change to a transparent, first or second color at a desired pre-determined critical temperature range of the fluid. A transparent polymer can include, but is not limited to, a polymer which is without color, i.e., colorless.

The temperature sensing device can be flexible or rigid, and/or part of a disposable or part of a non-disposable hardware system. The temperature sensing device can have the capability for sensing the temperature of a fluid with flow rates ranging from about 10 ml/min to about 1500 ml/min. The fluid delivery tube can consist of polyvinyl chloride, polyethylene, polyurethane and silicone.

In another aspect of the invention, an irrigation fluid delivery system for delivery of a fluid to a patient is disclosed to both heat and sense the temperature of the fluid. The system can consist of a heating means for heating the fluid, and a temperature sensing means for measuring and for providing a visual indication of the temperature of the irrigation fluid prior to the fluid entering the patient. The temperature sensing means can consist of a thermochromic liquid crystalline polymer material extruded or otherwise molded into a fluid delivery tube. This polymer material can be capable of exhibiting at least one color change in response to a change in temperature.

In yet another aspect of the invention, the temperature of an irrigation fluid in a fluid delivery tube can be measured prior to the fluid entering the patient. A fluid delivery tube including a liquid crystalline polymer material, which is molded into the fluid delivery tube and capable of exhibiting at least one color change in response to a change in temperature, can be provided. The fluid can be passed through the tube and the temperature of the fluid qualitatively measured by observing the color of the crystalline polymer in the fluid delivery tube. The fluid can be monitored to ensure its temperature is in a desired predetermined temperature range of about 36° C. to about 44° C. It can also be monitored to ensure that it does not exceed a maximum of about 50° C. above a storage temperature of the fluid.

Because of the simplicity and ease of the present invention's operation and its accurate measurement of fluid temperature, the present invention represents a valuable addition to the art of biological fluid temperature sensing, and in particular, the art of irrigation fluid temperature sensing.

BRIEF DESCRIPTION OF THE DRAWINGS

FIG. 3B shows the present invention's temperature sensing device including a thermochromic liquid crystalline polymer disposed in a triple-stripe form in an irrigation or infusion fluid delivery tube.

FIG. 4A shows present invention's temperature sensing device including a thermochromic liquid crystalline polymer molded into an irrigation fluid or infusion delivery tube and disposed in close proximity to the inner wall of the tube.

FIG. 4B shows the present invention's temperature sensing device including a thermochromic liquid crystalline polymer molded into an irrigation or infusion fluid delivery tube wall and disposed within the middle of the wall of the tube.

FIG. 4C shows the present invention's temperature sensing device including a thermochromic liquid crystalline polymer molded into an irrigation or infusion fluid delivery tube and disposed in close proximity to the outer wall of the tube.

FIG. 5 shows the present invention's temperature sensing device including a thermochromic liquid crystalline polymer co-extruded within an irrigation or infusion fluid delivery tube.

DETAILED DESCRIPTION OF THE INVENTION

The present invention provides devices, systems, and methods for directly sensing and providing a visual indication of the temperature of an irrigation fluid prior to its delivery to a patient.

Figure 1:
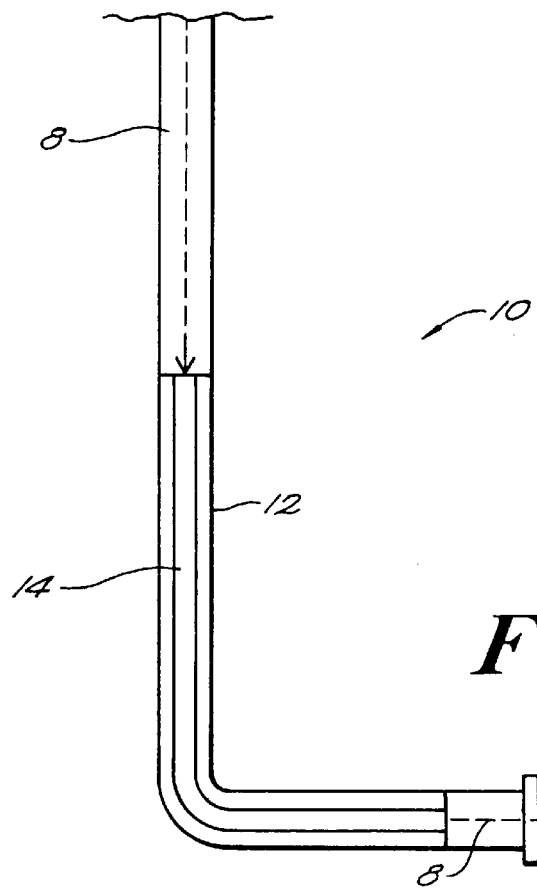
FIG. 1 is a perspective view of the temperature sensing device of the present invention including a thermochromic liquid crystalline polymer molded into an irrigation or infusion fluid delivery tube.

FIG. 1 illustrates a perspective view of the present invention's temperature sensing device 10 including a thermochromic liquid crystalline polymer 14 which is extruded or otherwise molded into an irrigation or infusion fluid delivery tube 12 and which can measure and provide a visual indication of the temperature of an irrigation or infusion fluid 8 prior to its delivery to a patient.

The thermochromic liquid crystalline polymer 14 can be incorporated into a known base buffer. Exemplary base buffers include polypropylene, polyethylene, polystyrene, acrylonitrile butadiene styrene, ethylene vinyl acetate, other materials that are well known for use as base buffers.

The molding of the thermochromic liquid crystalline polymer 14 and/or base buffer into the fluid delivery tube 12 can be accomplished by known molding processes such as continuous molding (i.e., fluid injection molding), extrusion (i.e., on-line continuous extrusion), and other molding processes known to persons of ordinary skill in the art of molding.

The thermochromic liquid crystalline polymer 14 can be chemically tailored to reversibly indicate a change in temperature by a change in color at a specific pre-determined temperature (i.e., 36° C.) and in response to an incremental change in temperature (i.e., a temperature change of 5° C.). The polymer 14 can also be chemically tailored to provide more than one change in color, such that a transition in color over a range of temperatures is indicated. For example, the polymer 14 can be transparent or a first color below a given temperature (i.e., 36° C.), can change to a transparent, first or second color over a desired pre-determined temperature range of the fluid (i.e., 36° C.–44° C.), and can further change to a transparent, first, second or third color at temperatures higher than the desired pre-determined temperature range of the fluid (i.e., at temperatures higher than 44° C.). Exemplary color changes include color to color, color to colorless (or transparent), and colorless (or transparent) to color transitions.

Figure 2:
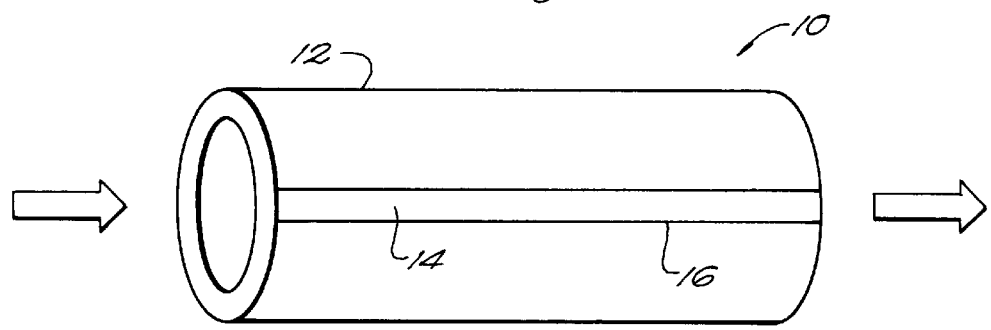
FIG. 2 is a close-up view of the present invention's temperature sensing device including a thermochromic liquid crystalline polymer disposed in a stripe form in an irrigation or infusion fluid delivery tube.
Figure 3A:
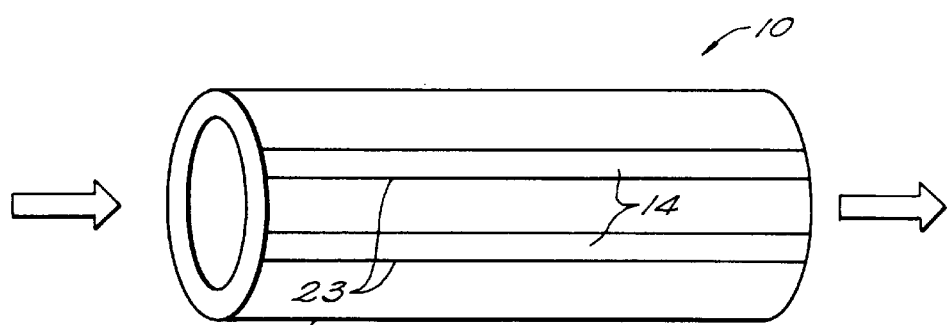
FIG. 3A shows the present invention's temperature sensing device including a thermochromic liquid crystalline polymer disposed in a double-stripe form in an irrigation or infusion fluid delivery tube.

FIG. 2 illustrates a close-up view of the present invention's temperature sensing device 10 including a thermochromic liquid crystalline polymer 14 disposed in a stripe form 16 in an irrigation or infusion fluid delivery tube 12. The polymer 14 can also be disposed in multi-stripe forms, i.e., in a double-stripe form 23, as shown in FIG. 3A, and in a triple-stripe form 25, as shown in FIG. 3B, on a single fluid delivery tube 12. Further, each stripe can consist of a different polymer 14 such that one stripe can change color at one desired temperature range, and another stripe can change color at a different temperature range. For example, one stripe could be blue at temperatures below 36° C. and become transparent at temperatures of 36° C. or higher. A second stripe could be transparent at temperatures below 44° C. and turn red at temperatures of 44° C. or higher.

The thermochromic liquid crystalline polymer 14 can also be molded into and disposed within the wall 18 of an irrigation or infusion fluid delivery tube 12. For example, FIG. 4A shows the liquid crystalline polymer 14 molded into and disposed in close proximity to the inner wall 15 of the irrigation or infusion fluid delivery tube 12, FIG. 4B, the liquid crystalline polymer molded into and disposed within the middle of a wall 17 of the irrigation or infusion fluid delivery tube 12, and FIG. 4C, the liquid crystalline polymer 14 molded into and disposed in close proximity to the outer wall 19 of the irrigation or infusion fluid delivery tube 12. Such incorporation of the polymer 14 into the fluid delivery tube 12 minimizes inaccuracies associated with the temperature gradient between the fluid and the outer surface of the tube 12.

The thermochromic liquid crystalline polymer 14 can also be co-extruded into an irrigation or infusion fluid delivery tube 12. For example, FIG. 5 shows that the thermochromic liquid crystalline polymer 14 can be co-extruded such that the polymer 14 is disposed as two stripes running from the inner to the outer diameter of into an irrigation or infusion fluid delivery tube 12 and along the length of the tube 12. Other extrusion variations known to those of ordinary skill in the art of molding extrusion processes are also possible.

The thermochromic liquid crystalline polymer 14 can consist of a thermotropic liquid crystalline polymer, such as those available from the Matsui International Company, Inc. in Gardena, Calif. The liquid crystalline polymer material can also consist of a cholesteric liquid crystalline polymer, such as those available from Hall Crest Products, Inc., in Glenview, Ill.

The temperature sensing device 10 can be flexible or rigid, and/or part of a disposable or part of a non-disposable hardware system. The device 10 can have the capability for sensing the temperature of a fluid with flow rates ranging from about 10 ml/min to about 1500 ml/min. The irrigation fluid delivery tube 12 can be constructed of a variety of known materials. Exemplary materials include, but are not limited to, polyvinyl chloride, polyethylene, polyurethane and silicone materials.

Figure 6:
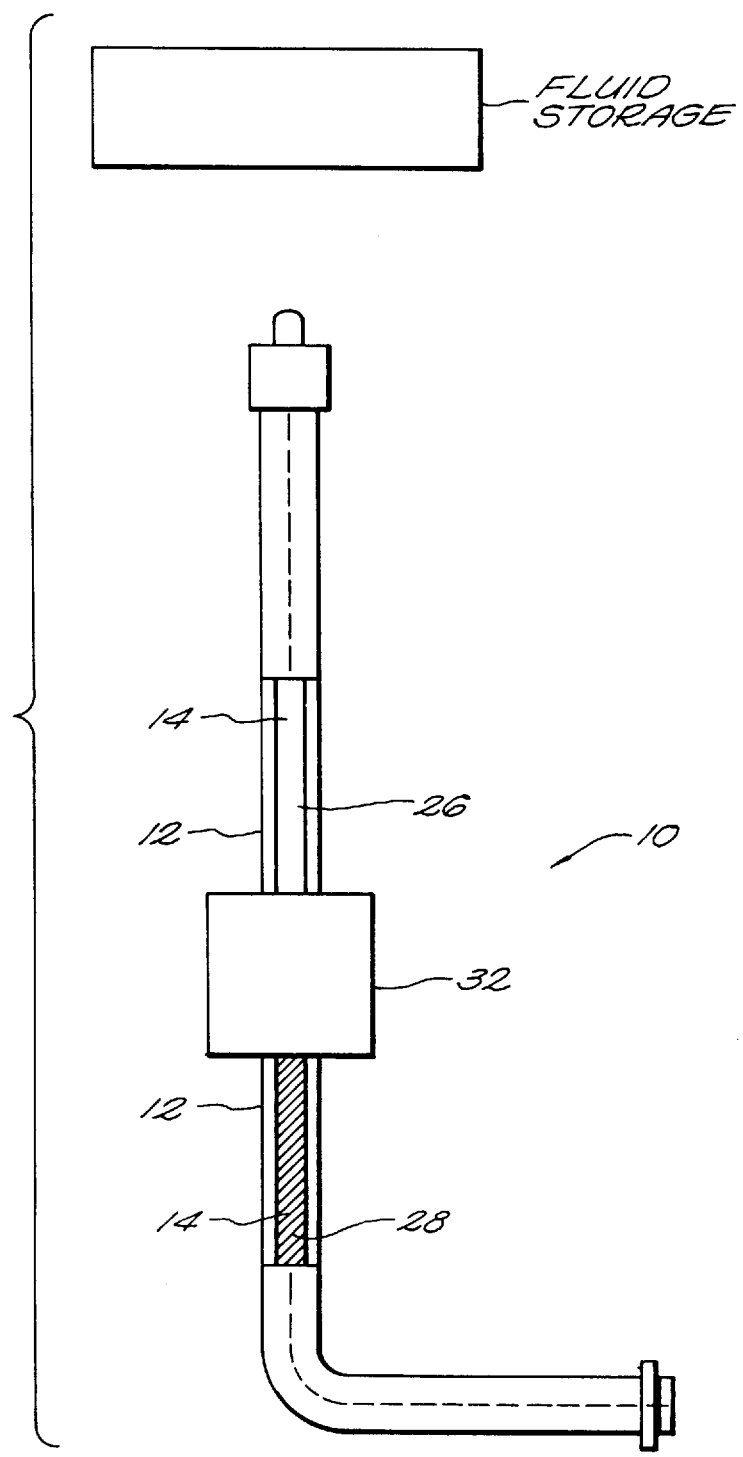
FIG. 6 shows the present invention's irrigation or infusion fluid delivery system having a heating means for heating an irrigation or infusion fluid and a temperature sensing device for measuring and providing a visual indication of the temperature of the irrigation or infusion fluid prior to its delivery to a patient.

FIG. 6 illustrates another aspect of the present invention in which an irrigation or infusion fluid delivery system 30 can be used to heat and measure the temperature of an irrigation or infusion fluid 8 prior to its delivery to a patient. The system can consist of a heating means 32 for heating the fluid 8, and a temperature sensing device 10 including a thermochromic liquid crystalline polymer 14 molded into an irrigation or infusion fluid delivery tube 12 for measuring and providing a visual indication of the post-heating temperature of the irrigation or infusion fluid 8 prior to its immediate delivery to a patient. FIG. 6 further shows the thermochromic liquid crystalline polymer 14 a transparent color 26 at a storage temperature of the fluid and a first color 28 at a desired pre-determined temperature range of the fluid.

In sum, this invention benefits from the recognition that a temperature sensing device including a thermochromic liquid crystalline polymer can be extruded or otherwise molded into a fluid delivery tube and can accurately measure and provide a simple, easy-to-use visual indication of the temperature of the fluid prior to its delivery to a patient. Further, this invention benefits from the recognition that such a temperature sensing device can be incorporated into a fluid delivery system containing a heating means such that a fluid can be heated, and the fluid temperature measured and visually indicated, both before and after heating, with one integrated system.

The device, system and method of the present invention have several advantages over the traditional devices and techniques for fluid temperature measurement. The present invention accurately measures the fluid temperature because the temperature sensing means is molded into the tube and minimizes the inaccuracies associated with the temperature gradient which exists between the fluid and the outer surface of the tube. In contrast, traditional devices and techniques do not accurately measure fluid temperature, because they measure the outside surface temperature of the fluid conduit or container. In addition, unlike the present invention which provides a temperature sensing means which can display reversible transitions in temperature, some of the traditional temperature display devices are irreversible and do not allow for the display of reversible temperature transitions.

Further, the present invention's incorporation of a temperature sensing means into the fluid delivery tube without entirely blocking the view of the fluid in the tube allows the clinician to simultaneously monitor the temperature, flow and general condition of the fluid. In contrast, traditional devices and techniques dispose liquid crystalline materials on intermediary layers which are then used to surround the fluid conduit and block the view of fluid in the fluid delivery line.

In addition, in comparison with traditional fluid delivery devices and techniques, the present invention's fluid delivery system containing both a heating means and the above-identified temperature sensing device provides a complete and integrated system for heating, and measuring and indicating the temperature of a fluid, prior to its delivery to patients. The traditional devices and techniques do not provide an easy-to-use, complete and integrated system incorporating the above-identified elements.

It will be understood that the above description pertains to only several embodiments of the present invention, That is, the description is provided above by way of illustration and not by way of limitation. For example, other dispositions of the liquid crystalline materials in the fluid delivery tube can be selected consistent with the present invention. In addition, the temperature sensing device 10 and the fluid delivery system 30 of the present invention can be employed in the delivery of fluids other than irrigation fluids. The invention is further characterized according to the following claims.

What is claimed is:

1. In an irrigation fluid delivery system having a fluid delivery tube, the fluid delivery tube having an inlet and an outlet through which fluid may pass and being adapted to deliver an irrigation fluid to a patient, the improvement comprising a temperature sensing device for measuring and for providing a visual indication of a temperature of the irrigation fluid prior to the irrigation fluid entering the patient, the temperature sensing device comprising a temperature responsive liquid crystalline polymer material molded into the fluid delivery tube and capable of exhibiting at least one color change in response to a change in temperature.

2. The device of claim 1, wherein the liquid crystalline polymer material is a thermotropic crystalline polymer.

3. In an irrigation fluid delivery system having a fluid delivery tube adapted to deliver an irrigation fluid to a patient, the improvement comprising a temperature sensing device for measuring and for providing a visual indication of a temperature of the irrigation fluid prior to the irrigation fluid entering the patient, the temperature sensing device comprising a temperature responsive liquid crystalline polymer material molded into the fluid delivery tube and capable of exhibiting at least one color change in response to a change in temperature, wherein the liquid crystalline polymer material is a cholesteric liquid crystalline polymer.

4. In an irrigation fluid delivery system having a fluid delivery tube adapted to deliver an irrigation fluid to a patient, the improvement comprising a temperature sensing device for measuring and for providing a visual indication of a temperature of the irrigation fluid prior to the irrigation fluid entering the patient, the temperature sensing device comprising a temperature responsive liquid crystalline polymer material molded into the fluid delivery tube and capable of exhibiting at least one color change in response to a change in temperature, wherein the liquid crystalline polymer material molded into the fluid delivery tube is disposed in a stripe form.

5. The device of claim 1, wherein the liquid crystalline polymer material molded into the fluid delivery tube is disposed in a wall of the tube.

6. In an irrigation fluid delivery system having a fluid delivery tube adapted to deliver an irrigation fluid to a patient, the improvement comprising a temperature sensing device for measuring and for providing a visual indication of a temperature of the irrigation fluid prior to the irrigation fluid entering the patient, the temperature sensing device comprising a temperature responsive liquid crystalline polymer material molded into the fluid delivery tube and capable of exhibiting at least one color change in response to a change in temperature, wherein the device is flexible.

7. In an irrigation fluid delivery system having a fluid delivery tube adapted to deliver an irrigation fluid to a patient, the improvement comprising a temperature sensing device for measuring and for providing a visual indication of a temperature of the irrigation fluid prior to the irrigation fluid entering the patient, the temperature sensing device comprising a temperature responsive liquid crystalline polymer material molded into the fluid delivery tube and capable of exhibiting at least one color change in response to a change in temperature, wherein the device is disposable.

8. In an irrigation fluid delivery system having a fluid delivery tube adapted to deliver an irrigation fluid to a patient, the improvement comprising a temperature sensing device for measuring and for providing a visual indication of a temperature of the irrigation fluid prior to the irrigation fluid entering the patient, the temperature sensing device comprising a temperature responsive liquid crystalline polymer material molded into the fluid delivery tube and capable of exhibiting at least one color change in response to a change in temperature, wherein the liquid crystalline polymer material is transparent at a storage temperature of the fluid and a first color at a desired pre-determined temperature range of the fluid.

9. The device of claim 1, wherein the liquid crystalline polymer material is a first color at a storage temperature of the fluid and a second color at a desired pre-determined temperature range of the fluid.

10. In an irrigation fluid delivery system having a fluid delivery tube adapted to deliver an irrigation fluid to a patient, the improvement comprising a temperature sensing device for measuring and for providing a visual indication of a temperature of the irrigation fluid prior to the irrigation fluid entering the patient, the temperature sensing device comprising a temperature responsive liquid crystalline polymer material molded into the fluid delivery tube and capable of exhibiting at least one color change in response to a change in temperature, wherein the device has a capacity for sensing the temperature of a fluid flow ranging from about 10 ml/min to about 1500 ml/min.

11. In an irrigation fluid delivery system having a fluid delivery tube adapted to deliver an irrigation fluid to a patient, the improvement comprising a temperature sensing device for measuring and for providing a visual indication of a temperature of the irrigation fluid prior to the irrigation fluid entering the patient, the temperature sensing device comprising a temperature responsive liquid crystalline polymer material molded into the fluid delivery tube and capable of exhibiting at least one color change in response to a change in temperature, wherein the fluid delivery tube comprises a material selected from the group consisting of polyvinyl chloride, polyethylene, polyurethane and silicone.

12. In an irrigation fluid delivery system having a fluid delivery tube adapted to deliver an irrigation fluid to a patient, the improvement comprising a temperature sensing device for measuring and for providing a visual indication of a temperature of the irrigation fluid prior to the irrigation fluid entering the patient, the temperature sensing device comprising a temperature responsive liquid crystalline polymer material molded into the fluid delivery tube and capable of exhibiting at least one color change in response to a change in temperature, wherein the liquid crystalline polymer material molded into the fluid delivery tube is extruded within the fluid delivery tube.

13. The device of claim 12, wherein the liquid crystalline polymer material extruded within the fluid delivery tube is co-extruded within the fluid delivery tube.

14. In an irrigation fluid delivery system having a fluid delivery tube adapted to deliver an irrigation fluid to a patient, the improvement comprising a temperature sensing device for measuring and for providing a visual indication of a temperature of the irrigation fluid prior to the irrigation fluid entering the patient, the temperature sensing device comprising a temperature responsive liquid crystalline polymer material molded into the fluid delivery tube and capable of exhibiting at least one color change in response to a change in temperature, where the device is rigid.

15. An irrigation fluid delivery system for delivery of a fluid to a patient, the delivery system comprising:

a heating means for heating the fluid; and a temperature sensing device for measuring and for providing a visual indication of a temperature of the irrigation fluid prior to the irrigation fluid entering the patient, the temperature sensing device comprising a temperature responsive liquid crystalline polymer material molded into the fluid delivery tube and capable of exhibiting at least one color change in response to a change in temperature.

16. A method for measuring of a temperature of an irrigation fluid in a fluid delivery tube comprising the steps of:

providing a fluid delivery tube having an inlet and an outlet through which the fluid may pass;

providing a liquid crystalline polymer material molded into the fluid delivery tube and capable of exhibiting at least one color change in response to a change in temperature;

flowing the fluid though the tube; and qualitatively measuring the temperature of the fluid by observing the color of the crystalline polymer in the fluid delivery tube.

17. A method for measuring of a temperature of an irrigation fluid in a fluid delivery tube comprising the steps of:

providing the fluid delivery tube through which the fluid may pass;

providing a liquid crystalline polymer material molded into the fluid delivery tube and capable of exhibiting at least one color change in response to a change in temperature;

flowing the fluid though the tube; and qualitatively measuring the temperature of the fluid by observing the color of the crystalline polymer in the fluid delivery tube; wherein the measuring step further comprises measuring the fluid temperature to a desired pre-determined temperature range of about 36° C. to about 44° C.

18. A method for measuring of a temperature of an irrigation fluid in a fluid delivery tube comprising the steps of:

providing the fluid delivery tube through which the fluid may pass;

providing a liquid crystalline polymer material molded into the fluid delivery tube and capable of exhibiting at least one color change in response to a change in temperature;

flowing the fluid though the tube; and qualitatively measuring the temperature of the fluid by observing the color of the crystalline polymer in the fluid delivery tube; wherein the measuring step further comprises measuring the fluid temperature to a maximum of about 50° C. above a storage temperature of the fluid.

* * * * *